United States Patent [19]
Tolar et al.

[11] 3,877,798
[45] Apr. 15, 1974

[54] LAMINATED MULTI-FOCAL LENSES

[76] Inventors: Harry R. Tolar, Hotel Goldsboro Building, 150 S. Center St., Goldsboro, N.C.; Arnold P. Gresser, 3316 Old Post Dr., Pikesville, Md.

[22] Filed: Sept. 3, 1970

[21] Appl. No.: 69,192

Related U.S. Application Data

[63] Continuation-in-part of Ser. No. 845,618, July 2, 1969, abandoned, which is a continuation of Ser. No. 391,916, Aug. 25, 1964, abandoned.

[52] U.S. Cl. ............... 351/168; 351/172; 351/176
[51] Int. Cl. .............................................. G02c 7/06
[58] Field of Search ...................... 351/168–172, 351/164, 159, 176, 177

[56] References Cited
UNITED STATES PATENTS

| 954,772 | 4/1910 | Alexander | 351/168 |
|---|---|---|---|
| 1,948,636 | 2/1934 | Tillyer | 351/177 |
| 2,024,552 | 12/1935 | Tillyer | 126/127 |
| 2,320,375 | 6/1943 | Moulton | 350/155 |
| 2,517,609 | 8/1950 | Tillyer | 351/167 |
| 2,618,200 | 11/1952 | Clave et al. | 351/172 |
| 2,868,075 | 1/1959 | Bivens | 178/69 |
| 3,024,691 | 3/1962 | Papke | 354/225 |
| 3,031,926 | 5/1962 | Hancock | 65/38 |
| 3,297,422 | 1/1967 | Emerson et al. | 64/54 |

FOREIGN PATENTS OR APPLICATIONS

| 338,555 | 11/1930 | United Kingdom |
| 661,581 | 11/1951 | United Kingdom |

*Primary Examiner*—David H. Rubin
*Attorney, Agent, or Firm*—Karl W. Flocks

[57] ABSTRACT

The successful fitting of bifocal lenses presents, conventionally, difficult and expensive problems due to a variety of different and conflicting requirements which must be mutually reconciled in every compound bifocal. In the present disclosure a standardized laminated lens system for compound bifocals is provided, of either positive or negative power, using a minus cylinder single vision lens on the inside having a standardized convex surface, and spherical lens on the outside having an inner concave surface of the same standardized curvature, the outer convex surface of the spherical lens having the bifocal addition associated therewith.

10 Claims, 3 Drawing Figures

PATENTED APR 15 1975  3,877,798

INVENTORS
HARRY R. TOLAR
ARNOLD P. GRESSER

BY  KARL W. FLOCKS

ATTORNEY

LAMINATED MULTI-FOCAL LENSES

This application is a continuation-in-part of Ser. No. 845,618 filed July 2, 1969, now abandoned which is in turn a continuation of application Ser. No. 391,916 filed Aug. 25, 1964, and now abandoned.

The present invention relates to laminated multifocal lenses and, more particularly, laminated bifocal optical lenses utilizing as one component a plus or minus power single vision minus cylinder lens.

The successful fitting of bifocal lenses presents one of the most difficult and expensive problems in the day-to day work load of an optician. A variety of different and conflicting requirements must be mutually reconciled in every compound bifocal. The expense of bifocal lenses is relatively high because each lens must be ground to order due to the conflicting requirements necessary in each lens, the extremely high number of permutations and combinations of different compound bifocal prescriptions, and cosmetic requirements. It has therefore been impossible to standardize compound bifocal prescriptions, since the stock required would be many thousands of different lenses.

Laminated lenses of both single vision and multifocal types are known in the prior art but these suffer from a plurality of difficulties. Plus cylinder lenses are usually utilized in laminated lenses since no system of utilizing minus cylinders in positive laminated lenses has been known. The use of plus cylinders, however, presents a disadvantage since a prescription is taken using minus cylinders and therefore a transposition is necessary when the prescription is filled.

Laminated lenses of the prior art, particularly bifocal lenses, have in general utilized one of the lenses merely to retain the bifocal segment in position or as a carrier for the bifocal segment. This increases the thickness and weight of the bifocal lens and makes it undesirable for cosmetic purposes.

It is therefore an object of the present invention to provide laminated multifocal optical lenses which overcome the deficiencies of the prior art, such as indicated above.

It is another object of the present invention to provide fully effective yet inexpensive multifocal lenses which can be formed by laminating different portions selected from a relatively small number maintained in stock.

It is another object of the present invention to provide a laminated bifocal lens which is nearly a duplicate of the optical structure utilized during the common test used to obtain the patient's prescription.

It is another object of the present invention to provide multifocal laminated lenses, the formation of which eliminates all surfacing labor at the laboratory, thereby producing the required prescription extremely economically.

It is another object of the present invention to greatly reduce the time required at the laboratory level in the production of multifocal lenses.

It is another object of the present invention to provide a new and improved compound minus cylinder laminated multifocal lens of either plus or minus power.

Another object of the present invention is to provide a system of providing a patient with a laminated compound bifocal minus cylinder correction of either positive or negative power.

It is another object of the present invention to provide a system of stocking lens components of varying powers having a single radius of curvature on the laminating surface.

It is another object of the present invention to provide a laminated multifocal lens of improved appearance which is very thin, light in weight, and strong.

These and other objects and the nature and advantages of the instant invention will be apparent from the following description taken in conjunction with the accompanying drawings, wherein.

The present invention specifically relates to a lens fabricating system wherein two factory finished components are joined together to achieve a finished compound bifocal or multifocal lens assembly of any desired foci wherein one of the components is a minus cylinder. The finished laminated lens may be produced with either positive or negative power in the minus cylinder with proper selection of the other component. Usually, the minus cylindrical lens portion is by itself a compound or sphero-cylinder lens, i.e. it has spherical power in addition to its cylindrical power.

Figure 1:
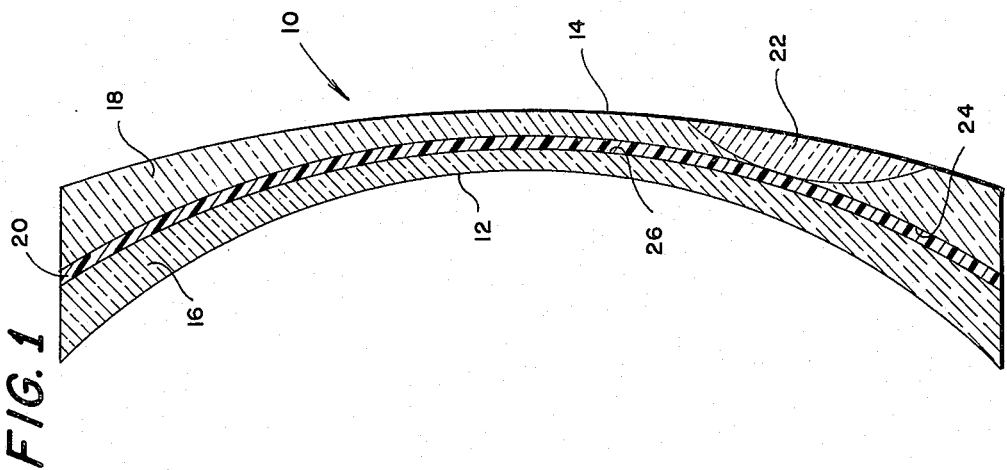
FIG. 1 is a cross sectional view of a laminated minus compound bifocal lens in accordance with the present invention.

FIG. 1 shows a finished laminated minus compound bifocal lens 10 in accordance with the present invention. The laminated minus lens 10 has an inner concave surface 12 and an outer convex surface 14. The lens 10 is formed by laminating a single vision minus cylinder 16 to a spherical bifocal 18 via an optical adhesive 20.

The bifocal portion 18 comprises a factory finished minus spherical bifocal lens having associated therewith a bifocal addition 22. The finished minus spherical bifocal portion 18 with the bifocal add 22 may be factory formed in a conventional manner known in the art. The spherical bifocal portion 18 comprises the convex outer surface 14 and a concave inner surface 24, the bifocal add 22 being imbedded in the convex surface 14.

The single vision portion 16 has a minus or concave cylinder surface 12 and a convex spherical surface 26 which is complementary to the concave surface 24 of the spherical bifocal portion 18. The single vision minus cylinder 16 is usually a compound lens, although it may, if desired, furnish only the astigmatism correction. This single vision portion 16 is also factory finished. In general, the inner lens portion 16 is a single vision compound lens of either positive or negative power which has a minus cylinder on its inner surface 12 and which has a fixed cylinder axis.

Figure 2:
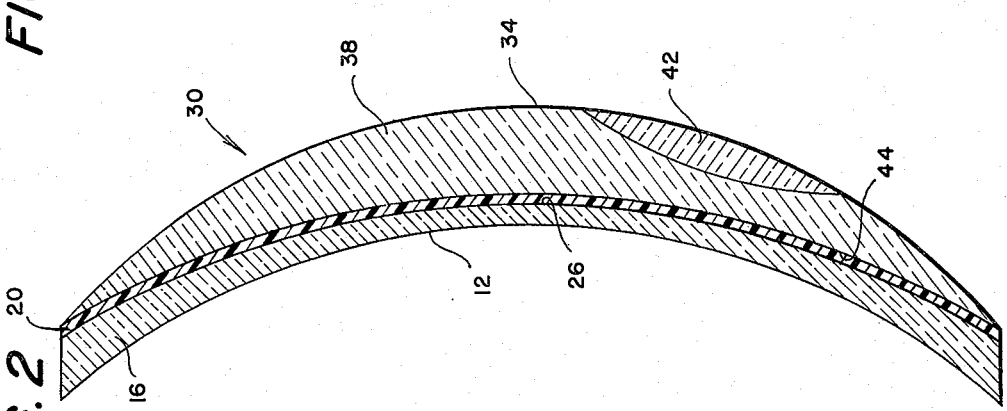
FIG. 2 is a cross section of a laminated plus compound bifocal lens in accordance with the present invention.

FIG. 2 shows a finished laminated plus compound bifocal lens 30 in accordance with the present invention comprising a single vision portion 16 having an inner minus cylinder surface 12 and a convex outer spherical surface 26, just as the single vision portion utilized in the laminated lens 10 of FIG. 1. The laminated plus compound bifocal lens 30 has an outer finished plus spherical bifocal lens portion 38 having an inner concave surface 44 and an outer convex surface 34. Embedded in the outer surface 34 of the finished plus spherical bifocal portion 38 is a bifocal reading segment 42. As in the laminated minus lens 10 of FIG. 1, lens 30 also requires that the convex surface 26 and the concave surface 44 be complementary and be joined by the optical adhesive 20.

Figure 3:
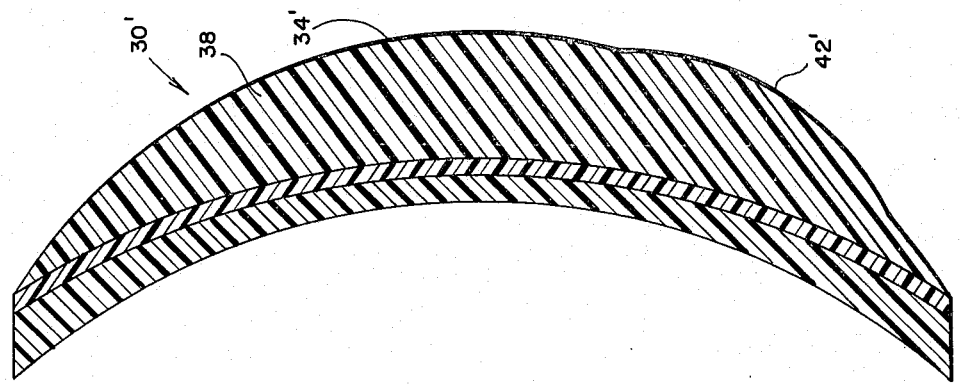
FIG. 3 is a cross section of the laminated plus compound bifocal lens of another embodiment in accordance with the present invention.

FIG. 3 shows another embodiment of a laminated plus compound bifocal lens 30' having essentially the same structure as the lens 30 of FIG. 2. However, the bifocal reading portion 42' of the lens 30' comprises an extension from the normal curvature of the convex surface 34'. In this embodiment the index of refraction of the portion 42' will be the same as that of the remainder of the finished bifocal portion 38. The "bulge out" type reading portion 42' in a bifocal lens is particularly useful where the lens 38 is formed of plastic. It is understood, of course, that the "bulge out" type bifocal segment may also be used with a minus lens.

An important aspect of the present invention is the utilization of two factory finished components. The factory finished components need not be further ground in the laboratory but need only be selected according to the proper prescription and then laminated together. Thus, all hand grinding (normally done in a laboratory) is eliminated since all the components are factory finished by mass production methods. The separate lens components may be formed of glass, plastic or any other material that will transmit light and that can be joined together.

Generally in the formation of optical lenses a great many conditions must be met in the lens other than the production of an image in a prescribed place. If the latter were the only desired object, then the lens could be ground in an infinite number of different ways, all of which would fit the prescription. Since there are two surfaces on a lens no matter what curvature is given to one of the surfaces, the other surface can then be ground so that the lens will have the required power, this being the sum of the surface curvatures. Since the lenses of the present invention are made up of two lens portions each of which has two surfaces, there are four surfaces in all. Two of these four surfaces must be complementary. These complementary surfaces have a radius of curvature in the order of about six diopters and preferably from 5.75 to 6.50 diopters. These complementary surfaces are referred to herein as a standard curvature for lamination. The remaining two surfaces will then provide, in the laminated or assembled lens, the proper prescription, which in all cases will correspond to the "best form".

The lenses of the present invention are particularly advantageous since they provide the bifocal segment on the outside or convex surface and the cylindrical surface on the inside or concave surface. This provides optical advantages as well as cosmetic advantages; the laminated lens may be thinner and also the two laminated surfaces (such as 26 and 24 in FIG. 1) may be formed of a standard curvature for lamination without any complicating factors being introduced due to either of such surfaces being either cylindrical or containing the bifocal segment.

The outer spherical lens portion 18 or 38 may have either bifocal or multifocal segments associated with its outer convex surface 14 or 34, respectively. While the bifocal segments 22 and 42 are shown to be of the fused type, it will be understood that the segment or segments may have any desired design or configuration necessary; cut segments may be provided. The reading segments may have an index of refraction like (42') or unlike (42 and 22) the base 18 or 38 in which it is fused, molded, laminated, or vacuum formed into or onto.

The lens portions 16, 18 and 38, all having the same curvatures or surfaces 26, 24 and 44 and with a variety of surface curvatures 12 and 34, may be stocked in an optical laboratory. Upon receipt of the prescription, the optician selects the appropriate lens portions and coats the mating surfaces with the desired optical adhesive, many of which are known in the prior art. The coating is preferably carried out by spraying or otherwise applying a thin uniform layer of adhesive on either or both of the lens portions. The selected inner minus cylinder lens portion 16 is then aligned with the sight of vision of the patient as set forth in the prescription and the two separate lenses are joined together to provide the minus cylinder laminated compound bifocal or multifocal lens of any desired forms.

Minus cylinders are a distinct advantage and are utilized in the present invention to contribute to "best form" and because prescriptions are written in minus cylinders. In laminated lenses used up until the present, it was necessary that the prescription, written in minus cylinders, be transposed to plus cylinders. In the present invention, the patient can see through the lenses in the same manner as was seen during the examination.

In general, the present invention may be practiced with a stock of only 100 outer lens portions 18 or 38 so that there are ten outside curves (14, 34), each with one of ten different bifocal additions 22, 42 or 42'. In a preferred stock only 480 inner lens portions 16 are needed to encompass the entire range of +20 (spherical) −3 (cylindrical) to −8 (spherical−3 (cylindrical) diopters and using the "best form". Utilizing 100 outer lens portions and 480 inner lens portions makes possible 13,440 different "best form" prescriptions before taking into account 36 axis rotations.

In another stock system, the present invention may be practiced with a stock of only 99 outer lens portions 18 or 38 so that there are 10 outside curves (14, 34), some of which have eleven different bifocal additions 22, 42 or 42' and one of which has as few as six adds. In this stock only 481 inner lens portions 16 are needed to encompass the entire range of +15 to −20 diopters and using the "best form". Utilizing 99 outer lens portions and 481 inner lens portions makes possible almost 48,000 total combinations before taking into account 36 axis rotations. Even accounting for the 36 axis rotations the 580 lens portions will produce almost 1,728,000 combinations, although it is understood that many of these combinations will be optical equivalents.

Theoretically the number of inner lens portions 16 may be reduced to as few as 104. When such a reduced number is utilized, there still may be accomplished 80 steps of spherical power corresponding to the product of 10 steps of spherical power in the outer lens and 8 steps of spherical power in the inner lens. There also may be accomplished 13 steps of cylinder correction in the inner lens portion. In such a reduced system the outer lens parts will number 100 and be equal to the product of 10 steps of near sight corrections and 10 steps of far power. The 104 pieces for the inner lens will correspond to the product of 8 steps of near power and 13 of astigmatism correction. Theoretically the assembly of one outer lens portion and one inner lens portion of this reduced number of components can produce any one of 80 steps of far power, 13 steps of cylinder correction and 10 steps of reading power.

Theoretically the number of combinations which can be provided will be the number of outer lenses multiplied by the number of inner lenses or 100×104 which is 10,400, assuming that the cylinder correction is always on one axis. If the cylinder axis is rotated through 36 steps, then the number of combinations which theoretically can be filled are 10,400×36 or 374,400 combinations.

By utilizing a relatively low number of standard lenses provided as taught by the present invention, an optician can provide a large number of lens prescriptions by merely selecting a desirable spherical bifocal in conjunction with a desirable single vision cylindrical correction lens. The single vision cylindrical lens may then be merely aligned with respect to the axis of vision of the patient to provide the proper prescription. Colored lenses may be made by simply uniformly coloring the adhesive used to laminate the lenses.

Another outstanding advantage of the present invention is its ability to use plastic lenses. Bifocal plastic lenses have not been used in the prior art because of the inability of the prior practitioners to suitably place the plastic bifocal segment and still be able to form a laminated lens. Plastic lenses provide an advantage also in that they may be colored either before or after lamination.

The term "optical adhesive" is intended to cover any adhesive which will both suitably transmit light and provide the desired adhesive properties to maintain the lens portions in laminated condition. Although many optical laminating materials have been used in the prior art, one material not previously mentioned which has been found to be exceptionally suitable for the present invention is clear epoxy resin. However, all such optical laminating adhesives may be used in the present invention. The use of an epoxy resin provides exceptionally strong lenses.

It is to be understood that the present invention is not limited to bifocals but is also useful for occupational multifocals. In certain instances it may be desired to laminate more than just two lens components together and this can be successfully accomplished in accordance with the present invention.

The invention provides that with the present system, only two series of components are generally necessary, one stock of bifocal lenses of varying powers and one stock of single vision cylindrical lenses of varying powers all having the same radius of curvature on their laminating surfaces, preferably from 5.75 to 6.50 diopters to provide "best form" over the entire range. This greatly reduces the number of lenses necessary to create laminated compound bifocals using minus cylinders on any required correction. The invention also provides a greatly simplified series of components allowing a broad range of powers of from +15.00 to −20.00 diopters.

The system of providing stocked factory finished lens components will generally be practical for powers ranging from about +6.00 to about −12.00 diopters in normal lenses and up to about +15.00 diopters in lenticular lenses. Thus the present system provides a greater range of powers with fewer lens components than any system previously known.

The following examples are given as an illustration and are not intended as limitations on the processes and products of the present invention.

EXAMPLE I

Prescription: +1.00 −.50 × 135 Add +2.00

A lens such as shown in FIG. 2 is produced by providing a finished plus spherical bifocal lens portion 38 having a plus convex surface 34 of +6.50 diopters and a minus concave surface 44 of −6.25 diopters, the plus spherical lens portion 38 having a bifocal addition 42 of +2.00 diopters. A single vision cylindrical lens 16 with a minus cylinder is selected having a plus 6.25 convex surface 26 and a power of +0.75−.50. The bifocal portion 38 is marked for the desired segment position, the marks being placed on the convex surface 34. The single vision portion 16 is then marked for axis 135, placing the marks on the concave surface 12. The concave surface 44 of the bifocal portion 38 and the convex side 26 of the single vision portion 16 are coated by spraying with a thin, uniform coating of an epoxy resin and are then pressed together until dry. The original markings may be used for edging.

EXAMPLE II

Prescription: −3.00 −.50 × 135 Add +2.25

The procedure of Example I is followed to produce a lens as shown in FIG. 1 utilizing a spherical minus lens 18 having a convex surface 14 of +4.00 diopters and a concave surface 24 of −6.25 diopters, wherein the convex surface 14 has a bifocal addition of +2.25 diopters. The single vision portion 16 with minus cylinder has a convex surface 26 of −6.25 diopters and a concave surface 12 of −7.00 −.50. Rotation of the single vision portion to axis 135° provides the desired prescription.

EXAMPLE III

Utilizing the procedure of Example I, a finished plus spherical bifocal lens similar to that of FIG. 2 having a convex surface 34 of +6.50 diopters and a concave surface 44 of −6.25 diopters, with a +2.00 diopters add is laminated to a single vision portion 16 with minux cylinder having a convex surface 26 of 30 6.25 diopters and a concave surface 12 of −6.00 diopters ×180° and −7.00 at 90°. The resultant prescription is: O.S. +0.50 −1.00 × 180 Add +2.00.

EXAMPLE IV

Prescription: +3.00 −0.75 × 45 Add +2.50

Utilizing the procedure of Example I a lens similar to that shown in FIG. 2 is produced by providing a finished plus spherical bifocal portion 38 having a convex surface 34 of +8.00 diopters with an add therein of +2.50 diopters and a concave surface 44 of −6.25 diopters and laminating such lens to a single vision portion 16 with minus cylinder having a convex spherical surface 26 of +6.25 diopters and a concave surface 12 of −5.00 diopters at 45° and −5.75 diopters at 135°.

EXAMPLE V

A lens similar to that of FIG. 2 is produced in accordance with the procedure of Example 1. The prescription is: +5.00 −0.50×180° Add +2.00. A finished plus spherical bifocal portion 38 having a convex surface 34 of +10.25 diopters with an add 42 of +2.00 diopters and having an inner concave surface 44 of −6.25 diopters is laminated with a single vision portion 16 with minus cylinder having a convex surface of +6.25 diopers and a concave surface of −5.75 diopters (the single vision portion 16 having a total power of +1.00 −50.×180°). surface 14 of +2.00 diopters, a concave surface 24 of −6.25 diopters and an add of +3.00 diopters. The single vision portion 16 with minus cylinder has a convex surface 26 of +6.25 diopters and a concave surface 12 of −9.25 diopters, the single vision portion 16 having a power of −3.00 −1.00×180.

EXAMPLE IX

A finished laminated minus compound bifocal lens is formed in accordance with the procedure of Example I by providing a finished plano-spherical bifocal portion having an add of +2.00 diopters and convex and concave surfaces of +6.25 diopters and −6.25 diopters, respectively. This portion is laminated to a single vision portion with minus cylinder having a convex surface of +6.25 diopters and a concave surface of −8.25 diopters, the single vision portion having a power of −2.00 cylinder×90°. The resultant prescription is: −2.00 Cyl.×90+2.00 Add.

EXAMPLE X

A lenticular laminated lens is formed in accordance with the procedure of Example I by providing a finished outer spherical lens portion having a convex surface of +16.00 with an add of +3.00 and a concave surface of −6.25; the outer spherical lens portion has a diameter of only 38 mm. The outer lens is laminated to a finished single vision lens portion with minus cylinder having a convex surface of +6.25 and a concave surface of −4.00×180 and −5.00×90; this inner lens has a conventional diameter of 58 mm. The

EXAMPLE VI

A prescription of +2.50−.50×180° with a +2.50 add and having a general configuration such as shown in FIG. 2 is produced according to the procedure of Example I by laminating a plus spherical bifocal portion 38 having a front surface of +8.25 diopters and a back surface of −6.25 diopters with a +2.50 addition together with a single vision portion 16 with minus cylinder having a front surface 26 of +6.25 diopters and a back surface 12 of −5.75 diopters, the single vision portion having a total power of +.50−.50×180°.

EXAMPLE VII

A lens having a configuration somewhat similar to that of FIG. 1 is produced in accordance with the procedure of Example I to provide a prescription of −2.00−2.00×90° add +2.00 by laminating a finished minus spherical bifocal lens portion 18 having a convex surface 14 of +4.25 and a concave surface 24 of −6.25 together with a single vision portion 16 with minus cylinder having a convex surface 26 of +6.25 and a convex surface 12 of −8.25 (single vision portion 16 has power of −2.00 plano-cylinder×90).

EXAMPLE VIII

A laminated minus compound bifocal lens in accordance with FIG. 1 is produced by the method of Example I to provide prescription of −7.25−1.00×180°+3.00 Add. The finished minus spherical bifocal portion 18 has a convex resultant laminated lenticular lens has a prescription of +12.00−1.00×180+3.00 Add.

It will be obvious to those skilled in the art that various changes may be made without departing from the scope of the invention and therefore the invention is not limited to what is shown in the drawings and described in the specification but only as indicated in the appended claims.

What is claimed is:

1. A finished laminated multifocal compound ophthalmic lens combination of acceptable thickness and which may be either positive or negative within the range of +15 to −12 diopters and including corrections for far sight, reading and astigmatism, said combination having an outer spherical lens portion which is further away from the eye and inner lens portion which is closer to the eye, said outer lens portion having refracting power and being a multi-vision lens and having an outer surface which is further away from the eye and an inner surface which is closer to the eye, said inner lens portion being a single vision lens and having an outer surface which is further away from the eye and an inner surface which is closer to the eye, the inner surface of said outer lens portion and the outer surface of said inner lens portion being adhesively joined, said lens assembly being characterized by
   a. the outer surface of said outer lens portion being convex spherical and having a bifocal addition located on said outer surface of said outer lens portion,
   b. the inner surface of said outer lens portion being concave of a single, standard pre-selected spherical curvature on the order of about six diopters,
   c. the outer surface of said inner lens portion being convex spherical and complementary to the inner surface of said outer lens portion of single, standard pre-selected spherical curvature,
   d. the inner surface of said inner lens portion including a cylinder correction, said inner lens portion being of non-uniform edge thickness,
   e. one of a series of various diopter values of said multi-vision spherical outer lens portions having the capability and capacity to cooperate by algebraic addition with one of a series of various diopter values of said single vision inner lens portions of sphero-cylindrical character to produce said finished laminated multifocal compound ophthalmic lens of any value within said range of +15 to −12 diopters.

2. A finished laminated multifocal compound ophthalmic lens combination of acceptable thickness and which may be either positive or negative within the range of +15 to −12 diopters and including corrections for far sight, reading and astigmatism, said combination having an outer spherical lens portion which is further away from the eye and an inner lens portion which is closer to the eye, said outer lens portion being a multi-vision lens and having an outer surface which is further away from the eye and an inner surface which is closer to the eye, said inner lens portion being a single vision lens and having an outer surface which is further away from the eye and an inner surface which is closer to the eye, the inner surface of said outer lens portion and the outer surface of said inner lens portion being adhesively joined, said lens assembly being characterized by
   a. the outer surface of said outer lens portion being convex spherical and having a bifocal addition associated therewith,
   b. the inner surface of said outer lens portion being concave of a standard pre-selected spherical curvature on the order of about six diopters,
   c. the outer surface of said inner lens portion being convex spherical and complementary to the inner surface of said outer lens portion of standard pre-selected curvature,
   d. the inner surface of said inner lens portion including a cylinder correction, said inner lens portion being of non-uniform edge thickness,
   e. one of a series of various diopter values of said multi-vision spherical outer lens portions having the capability and capacity to cooperate by algebraic addition with one of a series of various diopter values of said single vision inner lens portions of sphero-cylindrical character to produce said finished laminated multifocal compound ophthalmic lens of any value within said range of +15 to −12 diopters, wherein said bifocal addition is integral with said spherical lens and forms and extension from the outer surface thereof.

3. A finished laminated multifocal compound ophthalmic lens combination of acceptable thickness and which may be either positive or negative within the range of +15 to −12 diopters and including corrections for far sight, reading and astigmatism, said combination having an outer lens portions which is further away from the eye and an inner lens portion which is closer to the eye, said outer lens portion being a multi-vision lens and having an outer surface which is further away from the eye and an inner surface which is closer to the eye, said inner lens portion being a single vision lens and having an outer surface which is further away from the eye and an inner surface which is closer to the eye, the inner surface of said outer lens portion and the outer surface of said inner lens portion being adhesively joined, said lens assembly being characterized by
   a. the outer surface of said outer lens portion being convex spherical and having a bifocal addition associated therewith,
   b. the inner surface of said outer lens portion being concave of a standard pre-selected spherical curvature on the order of about six diopters,
   c. the outer surface of said inner lens portion being convex spherical and complementary to the inner surface of said outer lens portion of standard pre-selected curvature,
   d. the inner surface of said inner lens portion including a cylinder correction, said inner lens portion being of non-uniform edge thickness,
   e. one of a series of various diopter values of said multi-vision spherical outer lens portions having the capability and capacity to cooperate by algebraic addition with one of a series of various diopter values of said single vision inner lens portions of sphero-cylindrical character to produce said finished laminated multifocal compound ophthalmic lens of any value within said range of +15 to −12 diopters, wherein said outer lens portion is provided with far sight power.

4. A finished laminated lens combination in accordance with claim 1 wherein said inner lens portion is a sphero-cylinder provided with far sight spherical power.

5. A lens in accordance with claim 1 wherein said adhesive is an epoxy resin.

6. A method of forming a finished laminated multifocal compound ophthalmic lens in the range of +15 to −12 diopters comprising: selecting from a stock of about 100 different lenses all having one surface of a single, standardized curvature of about 6 diopters, a spherical lens portion having an inner concave surface of said standardized curvature, an outer convex surface and a bifocal addition located on said outer surface, said spherical lens portion being optically finished; selecting from a stock of about 480 different lenses an optically finished minus single vision cylindrical lens portion of non-uniform thickness having a spherical convex surface of said single standardized curvature complementary to said concave surface of said spherical lens portion; applying optical adhesive to the interface of said standardized complementary surfaces; aligning said cylindrical lens portion to fit the desired prescription; and laminating said lens portions together.

7. A lens stock for use in the manufacture of finished laminated multifocal compound "best form" ophthalmic lenses within the range of +15 to −12 diopters each having an inner concave cylindrical surface and an outer convex bifocal containing surface, said lens stock consisting essentially of:
   about 100 different finished spherical lens portions each having a bifocal addition located on the convex surface thereof and all having a concave surface of a single standardized curvature on the order of about six diopters; and
   about 480 different finished minus cylinder single vision lens portions of non-uniform thickness each having a different cylindrical concave surface and all having a convex surface of said single standardized curvature on the order of about six diopters;
   whereby said laminated lens may be formed of any "best form" desired prescription of +15 to −12 diopters by selection of a special lens portion and a minus cylinder lens portion for lamination together along said surfaces of said single standardized curvature.

8. A finished laminated multifocal compound ophthalmic lens, of positive power up to +15 diopters, having on the occular side a concave cylindrical surface and on the outer side a convex bifocal containing surface comprising:
   a spherical outer lens portion having positive power and a bifocal addition located on the outer surface thereof and having an inner spherical concave surface of a single, standardized pre-selected curvature;
   an optical adhesive on the inner spherical concave surface of said spherical lens portion; and
   a cylindrical single vision lens portion of nonuniform thickness on the inner surface of said adhesive, said cylindrical lens portion having an outer convex surface of said single, standardized pre-selected curvature complementary to the inner concave surface of said spherical lens portion, and an inner occular surface having a spherocylinder curvature.

9. A finished, laminated, multi-focal compound ophthalmic lens combination of acceptable thickness and of far-sight power within the range of +15 to −12 diopters, and including corrections for far-sight, reading and astigmatism, comprising means for providing partial far-sight correction and reading correction selected from the group consisting of about 100 different finished spherical lens portions each having an outer convex and an inner concave surface, each having a bifocal addition for said reading correction associated with said convex surface, said spherical lens portions being divided into about 10 groups of about 10 lens portions in each of said 10 groups wherein each lens in a said group has the same correction for said far-sight but has a different bifocal addition for said reading, and each said lens portion having a single standardized curvature on said concave surface on the order of about 6 diopters;

an optical adhesive located along the concave 6-diopter surface of said finished spherical lens portion; and means for correction of astigmatism and partial correction for far-sight selected from the group consisting of about 480 different finished minus cylinder, single vision lens portions of nonuniform thickness, each having a cylindrical concave surface and a convex surface of said single standardized curvature on the order of about 6 diopters, said convex surface of said minus cylinder single vision lens portion being laminated by way of said adhesive to said concave surface of said spherical lens portion;

whereby a finished laminated lens is provided of "best form" having a prescription of +15 to −12 diopters having on the occular side a minus cylinder and on the outer side a convex bifocal containing surface.

10. A series of finished laminated multi-focal, compound, ophthalmic lens combinations of acceptable thickness and far-sight power within the range of +15 to −12 diopters, and including corrections for far-sight, reading, and astigmatism, comprising means for providing partial far-sight correction and reading correction selected from a first lens portion group consisting of about 100 different finished spherical lens portions each having an outer convex and an inner concave surface, each selected lens for each lens combination of the series having a bifocal addition for said reading correction associated with said convex surface, and each selected lens for each lens combination of the series having a single standardized curvature on said concave surface on the order of about 6 diopters;

an optical adhesive located along the concave 6-diopter surface of the said finished spherical lens portions of the series; and means for partial correction for far-sight and correction for astigmatism selected from a second lens portion group consisting of about 480 different finished minus cylinder, single vision lens portions of non-uniform thickness, each selected means for each lens combination of the series having a minus cylinder surface on the occular side and a convex surface of said single standardized curvature on the order of about 6 diopters, said convex surface of a said minus cylinder vision lens portion being laminated by said adhesive to the concave surface of a said spherical lens portion;

any correcting means lens portion selected from said first group capable of being operatively and cooperatively associated by lamination with any selected correcting means lens portion from said second group to produce a series of different finished prescription lenses as the cooperating surfaces of the lens portions of said first group and the lens portions of said second group have a standardized curvature on the order of about 6 diopters;

each of said laminated lenses in said series being a "best form" lens within the range of +15 to −12 diopters to fill any prescription for far-sight, reading, and astigmatism within said range, and having on the occular side a minus cylinder and on the outer side a convex bifocal-containing surface, each of said prescriptions in said series being different from each other.

* * * * *

UNITED STATES PATENT OFFICE
CERTIFICATE OF CORRECTION

Patent No. 3,877,798        Dated April 15, 1975

Inventor(s) Harry R. Tolar and Arnold P. Gresser

It is certified that error appears in the above-identified patent and that said Letters Patent are hereby corrected as shown below:

Above column 2, the issue date line should read:

[45] Apr. 15, 1975

Signed and Sealed this twenty-ninth Day of July 1975

[SEAL]

Attest:

RUTH C. MASON
*Attesting Officer*

C. MARSHALL DANN
*Commissioner of Patents and Trademarks*

FORM PO-1050 (10-69)